ABILITY# UNITED STATES PATENT OFFICE 2,200,069

SPIRIT PRINTING INKS AND PROCESS OF MAKING SAME

Herbert August Lubs and Crayton K. Black, Wilmington, Del., assignors to E. I. du Pont de Nemours & Company, Wilmington, Del., a corporation of Delaware No Drawing. Application January 21, 1937, Serial No. 121,570

14 Claims. (Cl. 134—35)

This invention relates to spirit printing inks. Spirit printing inks, that is printing inks in which the vehicle is alcohol instead of the customary linseed oil, have of late been assuming great importance in industry. The advantages of such inks over the ordinary linseed oil inks are: economy of materials, their quick drying feature as compared with oil inks, and the fact that they enable the printer to use a rubber printing roll which is cheaper than a metal engraved roll. The full development of spirit printing inks, however, has been hampered by difficulties in selecting proper coloring matters therefor. Originally, spirit soluble dyes have been used for this purpose. These have the advantage of remaining indefinitely in solution and being capable of being made into good consistency inks by the addition of shellac or other binders. They have, however, the disadvantage that they are generally fugitive to light and have little or no hiding or covering power as a print. In addition, many of them exhibit an undesirable water bleed.

To overcome these defects, it has been proposed to employ insoluble pigments as coloring matter. These, however, have the disadvantage that when dispersed by ordinary methods, for instance by milling with a vehicle, the dispersion is not of a permanent character. In other words, such inks settle readily upon standing. Furthermore, such inks do not bring out the full strength of the color employed.

This invention has as its object to produce improved color printing inks of the spirit ink type which are free of the above noted defects. More particularly, it is an object of this invention to produce spirit printing inks which employ insoluble pigments such as inorganic colors, organic lakes or toners, vat colors or colors of the phthalocyanine series, thereby overcoming the defects of fugitiveness to light and water, and increasing the hiding or covering power of the pigment. At the same time, it is an object of this invention to produce a printing ink in which the coloring matter is so thoroughly dispersed as to be practically indistinguishable from a solution, and which does not settle out upon standing.

It is a further object of this invention to produce pigments in such a form as to be adapted for incorporation in alcohol to produce improved spirit printing inks of the above type. Other and further objects of this invention will appear as the description proceeds.

These objects are accomplished according to our invention by employing spirit insoluble pigments as the coloring matter, but subjecting the same to a special treatment whereby to convert them into a highly dispersible form. This treatment according to our invention consists of subjecting the pigment to plastic milling in a colloidal alkyl cellulose. More particularly, the pigment is mixed with an alkyl ether of cellulose such as methyl, ethyl or benzyl cellulose and subjected to a kneading operation in a dough mixer or other suitable apparatus. After drying the combined pigment and alkyl cellulose mass, it is ground to a fine powder which is then dispersed in alcohol by simply stirring the two together, preferably at elevated temperature.

By colloidal alkyl cellulose, we mean to include the lower alkyl ethers of cellulose such as methyl or ethyl cellulose, as well as aralkyl ethers of cellulose such as benzyl cellulose. In general the colloidal cellulosic derivative employed for our invention may be defined by the general formula $A—(OCH_2—R)_n$, wherein A designates the residue of cellulose, R stands for hydrogen or a lower alkyl or lower aryl radical, and $n$ stands for a numeral not greater than 3. The ultimate test for applicability to our invention is the spirit solubility of the cellulose ether.

Throughout this specification and in the claims below when we speak of spirit solubility, we employ the word "spirit" in the sense in which it is ordinarily employed in this art; namely, alcohol, more particularly ethyl alcohol.

The method of plastic milling of the pigment in the alkyl cellulose may follow the usual practice with plastic millings of this type. See, for instance, U. S. Patent No. 2,052,470 to Hucks. The method of incorporating the treated pigment into the alcohol, as already indicated, may consist of simply stirring the two together at elevated temperature, or may follow any equivalent practice as will be readily understood by those skilled in the art.

Without limiting our invention to any particular procedure, the following examples in which parts by weight are given will serve to illustrate our preferred mode of operation:

*Example 1*

35 parts of ethyl cellulose were thoroughly wet with 35 parts of ethyl alcohol in a mixer of the Werner-Pfleiderer type. 35 parts of the coloring matter obtainable by coupling diazotized m-nitro-p-toluidine with acetoacetanilide, in powder form, were added, and the mixture was kneaded as a very heavy paste for one hour. Considerable heat was developed during the milling. The material was discharged from the mill, dried to get rid of traces of solvent and ground to a powder. Seven parts of this powder were added to 100 parts of denatured alcohol heated to the boil. After cooling, the resulting ink was printed on a spirit printing machine of the rubber roll type. The ink showed excellent printing properties, proper viscosity and no signs of settling even on long standing. When filtered through a hard filter paper (#50 Whatman), it showed no appreciable residue on the paper indicating excellent dispersion. An ink made by dissolving the same amount of ethyl cellulose in alcohol and adding the same coloring matter except that it was mixed by ordinary methods would not filter through a hard filter paper. A print from this latter ink was much weaker than the one from the ink from pigment treated according to this invention.

*Example 2*

Chrome Yellow (lead chromate) was substituted for the coloring matter in Example 1. An ink of the same excellent properties of that described in Example 1 was obtained.

*Example 3*

Copper phthalocyanine was substituted for the pigment in Example 1. A blue ink of exceptional light fastness and excellent properties was obtained.

*Example 4*

The phosphotungstic acid toner of Victoria Blue R (C. I. #728) was substituted for the pigment in Example 1. An ink of excellent properties was obtained.

*Example 5*

Iron Blue was used as the pigment. The method of Example 1 was followed with the same excellent results.

*Example 6*

The vat dye known as Jade Green (C. I. #1101) was treated as was the pigment in Example 1. A green ink of excellent light fastness was obtained.

*Example 7*

Lithol Red calcium salt, (cf. C. I. #189) was substituted for the pigment in Example 1. The ink showed excellent properties.

*Example 8*

35 parts of copper phthalocyanine and 17.5 parts of titanium dioxide were substituted for the 35 parts of the powder used in Example 1. The resulting ink showed not only excellent printing properties and light fastness but increased hiding power.

It will be understood that our invention is susceptible of wide variation and modification without departing from the spirit of this invention. Thus, the proportion of pigment to ethyl cellulose may be varied within limits. The viscosity of the resulting ink is dependent partially on the amount of ethyl cellulose present. Stronger or weaker prints can be made by varying the amount of treated pigment added to the alcohol.

By ethyl cellulose in this specification is meant cellulose ethylated to such an extent as to give an alcohol soluble product. This is usually accomplished by ethylating to the extent of between 40 and 48%. Methyl celluloses, benzyl celluloses and other cellulose ethers having alcohol solubility may be used.

As pigments, not only the above mentioned types, but also lakes or pigments extended with substrata, may be used. Any of the common inorganic white pigments may be substituted for the pigment in the examples.

As solvents or diluents for the ink, the lower boiling aliphatic alcohols are most commonly used. Other solvents for ethyl cellulose may be used. It is essential that the cellulose ether have sufficient solubility in the solvent to give a satisfactory viscosity and finish to a printing ink. For this reason, aromatic solvents such as benzene, toluene, xylene, etc. are in general not suitable except when used in conjunction with alcohol.

Benzene type solvents cannot, of course, be printed from rubber rolls. On the other hand, spirit inks (made from alcohol) are not sufficiently viscous to be printed satisfactorily from the etched copper rotogravure rolls. The inks of this invention are therefore best prepared with alcohol as the diluent and are best suited for rubber roll engravings.

As explained in Example 1, the milled pigment produces ink of much superior properties to those in which the pigment is simply stirred into the other ingredients of the ink.

It is believed that during the milling procedure the individual particles of pigment become occluded with a layer of ethyl cellulose, and these layers remain attached to the particles even after the pigment has been suspended in a large volume of alcohol. The alcohol, which is normally a solvent for ethyl cellulose, exerts a tension on the adherent layers thus causing the pigment particles to be suspended in the alcohol and behave as though they were dissolved therein.

Generally speaking, by this invention it is possible to put insoluble pigments into such form that they will disperse in alcohol so thoroughly as to behave as a solution in alcohol and still retain, when printed, the desirable properties of pigments.

In the claims below the expression "a spirit printing ink" shall be understood as referring to an ink whose principal vehicle is a low-boiling aliphatic alcohol, and which possesses such a high proportion of this vehicle to total solid content as to produce an ink of low viscosity adapted to be applied from an engraved rubber roll.

We claim:

1. The process of producing a printing ink adapted for use with rubber printing rolls which comprises forming a mixture of a doughy consistency of an alkyl cellulose, a spirit insoluble pigment and a low boiling, aliphatic alcohol, subjecting the dough to a kneading operation whereby to break up the color particles and uniformly disperse the same throughout the mass, drying the mass and grinding the same to a powder, and finally incorporating the same with an alcohol diluent to produce a printing ink of the desired consistency.

2. The process of producing a spirit printing ink adapted for use in rotogravure printing by the aid of engraved rubber rolls, which comprises mixing substantially equal parts by weight of ethyl cellulose, ethyl alcohol and a spirit insoluble coloring matter, subjecting the mass so formed to internal work milling until the coloring matter has been substantially uniformly dispersed throughout the mass, drying the mass, grinding the same to a powder and further incorporating the same into an alcoholic diluent suitable for printing by the spirit printing ink method.

3. A process as in claim 2, the coloring matter being a pigment of the phthalocyanine series.

4. A process as in claim 2, the coloring matter being copper-phthalocyanine.

5. A process as in claim 2, the coloring matter being a water-insoluble pigment of the azoic series.

6. A process as in claim 2, the coloring matter being the azo color obtainable by coupling diazotized m-nitro-p-toluidine with acetoacetanilide.

7. A process as in claim 2, the coloring matter being the calcium salt of Lithol Red.

8. A spirit printing ink comprising a low boiling alcoholic vehicle, an alkyl ether of cellulose and a finely divided spirit insoluble pigment, the pigment being uniformly dispersed throughout the vehicle as is obtainable by kneading said pigment jointly with said alkyl ether and alcoholic vehicle according to the process defined in claim 1, and the said printing ink being characterized by high stability against settling and by the property of passing through a hard filter paper without substantial loss of color.

9. A spirit printing ink comprising ethyl alcohol, ethyl cellulose and a spirit insoluble coloring matter, the coloring matter being finely divided and uniformly dispersed throughout the composition as is obtainable by plastic milling of said coloring matter jointly with ethyl cellulose and ethyl alcohol, and the said printing ink being characterized by high stability against settling, and by the property of passing substantially completely through a hard filter paper.

10. A spirit printing ink as in claim 9, the coloring matter being a pigment of the phthalocyanine series.

11. A spirit printing ink as in claim 9, the coloring matter being copper-phthalocyanine.

12. A spirit printing ink as in claim 9, the coloring matter being a water-insoluble pigment of the azoic series.

13. A spirit printing ink as in claim 9, the coloring matter being the azo color obtainable by coupling diazotized m-nitro-p-toluidine with acetoacetanilide.

14. A spirit printing ink as in claim 9, the coloring matter being the calcium salt of Lithol Red.

HERBERT AUGUST LUBS.
CRAYTON K. BLACK.